United States Patent
Zhang et al.

(10) Patent No.: US 12,531,846 B2
(45) Date of Patent: Jan. 20, 2026

(54) TRUSTING A CERTIFICATE FOR A SECURE CONNECTION BASED ON A REMOTE USER SESSION

(71) Applicant: Citrix Systems, Inc., Fort Lauderdale, FL (US)

(72) Inventors: Zhifu Zhang, Nanjing (CN); Hengbo Wang, Nanjing (CN)

( * ) Notice: Subject to any disclaimer, the term of this patent is extended or adjusted under 35 U.S.C. 154(b) by 621 days.

(21) Appl. No.: 17/930,918

(22) Filed: Sep. 9, 2022

(65) Prior Publication Data

US 2024/0056435 A1 Feb. 15, 2024

Related U.S. Application Data

(63) Continuation of application No. PCT/CN2022/112290, filed on Aug. 12, 2022.

(51) Int. Cl.
*G06F 7/04* (2006.01)
*H04L 9/40* (2022.01)
*H04L 67/141* (2022.01)

(52) U.S. Cl.
CPC ...... *H04L 63/0823* (2013.01); *H04L 63/0876* (2013.01); *H04L 67/141* (2013.01)

(58) Field of Classification Search
CPC . H04L 63/0823; H04L 63/0876; G06F 21/33; G06F 21/335
See application file for complete search history.

(56) References Cited

U.S. PATENT DOCUMENTS

| | | | |
|---|---|---|---|
| 9,419,942 B1* | 8/2016 | Buruganahalli | H04L 63/20 |
| 2010/0205429 A1* | 8/2010 | Alrabady | H04L 63/0823 |
| | | | 713/156 |
| 2012/0084570 A1* | 4/2012 | Kuzin | G06F 21/41 |
| | | | 726/8 |

OTHER PUBLICATIONS

Yepes et al, Bringing Strong Authentication and Transaction Security to the Realm of Mobile Devices, Jan. 20, 2014, IEEE, pp. 4:1-4:11. (Year: 2014).*
Dawei et al, Protocol for Trusted Channel Based on Portable Trusted Module, Nov. 22, 2013, IEEE, pp. 1-14. (Year: 2013).*

* cited by examiner

*Primary Examiner* — Philip J Chea
*Assistant Examiner* — Jenise E Jackson (57) ABSTRACT

Methods and systems for establishing trust in certificates based on remote user sessions are described herein. A computing device may establish, via a gateway, one or more remote user sessions of virtualized application, cloud-based applications, and/or remote desktops. The computing device may initiate an establishment process for a secure connection with a secure server. The computing device may, as part of the establishment process, may receive a certificate for the secure server. The computing device may locally determine whether the certificate is trusted. If the certificate is not trusted, the computing device may select a remote user session to perform a remote attempt for determining trust in the certificate. The computing device may send the certificate to the selected remote user session and may receive data indicating a result of the remote attempt. The computing device may determine whether the certificate is trusted by the remote attempt.

20 Claims, 5 Drawing Sheets

TRUSTING A CERTIFICATE FOR A SECURE CONNECTION BASED ON A REMOTE USER SESSION

CROSS-REFERENCE TO RELATED APPLICATIONS

This application is a continuation of, and claims priority to, PCT application number PCT/CN22/112290, filed Aug. 12, 2022. The entirety of the above-mentioned PCT application is incorporated by reference in its entirety.

FIELD

Aspects described herein generally relate to secure connections for communication between devices, determining trust in a certificate for the secure connection, and remote user sessions.

BACKGROUND

When establishing a secure connection for communication between a user device and a secure server, there is a need to determine whether to trust a certificate provided to the user device by the secure server. To make this determination, the user device may determine whether to trust the certificate based on a local store of certificates installed on the user device. For example, when establishing a Secure Sockets Layer (SSL) connection, the secure server may send an SSL certificate to the user device. The user device may determine whether to trust the SSL certificate based on whether the user device has, within its local store of certificates, a root or intermediate certificate authority (CA) certificate that signed the SSL certificate. In this way, the user device will be unable to trust the SSL certificate if the local store of certificates does not store the root or intermediate CA certificate.

An operating system or initial configuration of the user device may include storing an initial set of certificates the user device's local store of certificates. If the user device attempts to establish a secure connection to any secure server associated with the initial set of certificates, the user device may be able to trust certificates from those associated secure servers. However, the user device may attempt to establish secure connections to secure servers that are not associated with the initial set of certificates. Without additional certificates installed on the local store, the user device may not trust the certificates received from those non-associated secure servers. One way to trust certificates from those non-associated secure servers is to install additional certificates the user device's local store.

For some user devices, such as those fully managed by an enterprise, the additional certificates could be pushed to the user device by the enterprise. But when the user device is unmanaged, or partially managed, installing certificates to the user device's local store may be difficult or may negatively impact user experience. For example, for certain unmanaged, or partially managed, user devices, pushing the certificates to the local store may not be available. As another example, for certain unmanaged, or partially managed, user devices, the user may be required to manually install certificates to their user device via link, chat room, hardware device, or the like.

An enterprise that allows unmanaged, or partially managed devices, to connect with enterprise devices and/or enterprise resources may face many challenges to overcoming these difficulties and/or negative impacts to user experience. Indeed, a bring-your-own-device (BYOD) arrangement where a user supplies their own device may introduce difficulties in installing additional certificates onto BYOD user devices and/or may find that users are resistant to being required to manually install additional certificates onto their BYOD user device. Moreover, if the user manually installs the additional certificates, the ability for the user to manually install additional certificates may introduce a potential security risk to the BYOD device. Additionally, if the user fails to manually install the additional certificates to their BYOD user device and ignores messages indicating that certain SSL certificates are not trusted, the security of the BYOD user device may be diminished.

SUMMARY

The following presents a simplified summary of various aspects described herein. This summary is not an extensive overview, and is not intended to identify required or critical elements or to delineate the scope of the claims. The following summary merely presents some concepts in a simplified form as an introductory prelude to the more detailed description provided below.

To overcome limitations in the prior art described above, and to overcome other limitations that will be apparent upon reading and understanding the present specification, aspects described herein are directed towards improving techniques in which determinations whether to trust a certificate for a secure connection are performed. As some examples, processes that establish a secure connection for communication between a user device and a secure server may be improved. As one particular example, the user device may establish the secure connection based on a determination, performed by a remote user session, that a certificate for the secure connection is trusted. As additional examples, computing environments that allow unmanaged, or partially managed, user devices to connect with enterprise resources and/or enterprise resources may be improved. As one particular example, enterprises may avoid the need to require users of BYOD devices to install additional certificates to their BYOD device's local store by using one or more remote user sessions to perform a determination whether a certificate for a secure connection is trusted.

As will be explained in further detail below, a computing device may establish, via a gateway, one or more remote user sessions of virtualized application, cloud-based applications, and/or remote desktops. The computing device may initiate an establishment process for a secure connection with a secure server. The computing device may, as part of the establishment process, may receive a certificate for the secure server. The computing device may locally determine whether the certificate is trusted. If the certificate is not trusted, the computing device may select a remote user session to perform a remote attempt for determining trust in the certificate. The computing device may send the certificate to the selected remote user session and may receive data indicating a result of the remote attempt. The computing device may determine whether the certificate is trusted by the remote attempt.

These and additional aspects will be appreciated with the benefit of the disclosures discussed in further detail below.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

As a general introduction to the subject matter described in more detail below, aspects described herein are directed towards establishing a secure connection for communication between a user device and a secure server, and causing one or more remote user sessions to perform a determination as to whether a certificate for the secure connection is trusted. The secure connection, for example, may be an SSL connection. The one or more remote user sessions may include one or more sessions for a virtualized application, one or more sessions for a cloud-based application, and/or one or more sessions for a remote desktop. Each of the one or more remote user sessions may be for the same user device (e.g., a remote user session of a virtualized application being remotely executed for the user device, a remote user session of a cloud-based application being remotely executed for the user device, and/or a remote user session of a remote desktop being remotely executed for the user device). When the user device attempts to establish a secure connection with the secure server, the user device may, among other things, receive a certificate for the secure connection from the secure server. The user device may send the certificate to at least one remote user session. The certificate for the secure connection may be sent via an additional secure connection that was established for communication between the user device and the at least one remote user session. The additional secure connection may be a transport layer security (TLS) connection. Upon receipt of the certificate for the secure connection, the at least one remote user session may determine whether the certificate is trusted. This determination may be performed based on a certificate store configured for the remote user session and associated with the user device. This certificate store may include one or more root or intermediate CA certificates. After performing the determination, the at least one remote session may send data indicating whether the certificate is trusted to the user device. Upon receipt of the data, the user device may proceed with establishing the secure connection based on whether the data indicates the certificate is trusted or is not trusted. For example, if the data indicates that the certificate is trusted, the user device may establish the secure connection. If the data indicates that the certificate is not trusted, the user device may display a message to a user indicating the certificate is not trusted and request the user's permission to proceed with establishing the secure connection.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "connected," "coupled," and similar terms, is meant to include both direct and indirect connecting, coupling, and the like.

Computing Architecture

Figure 1:
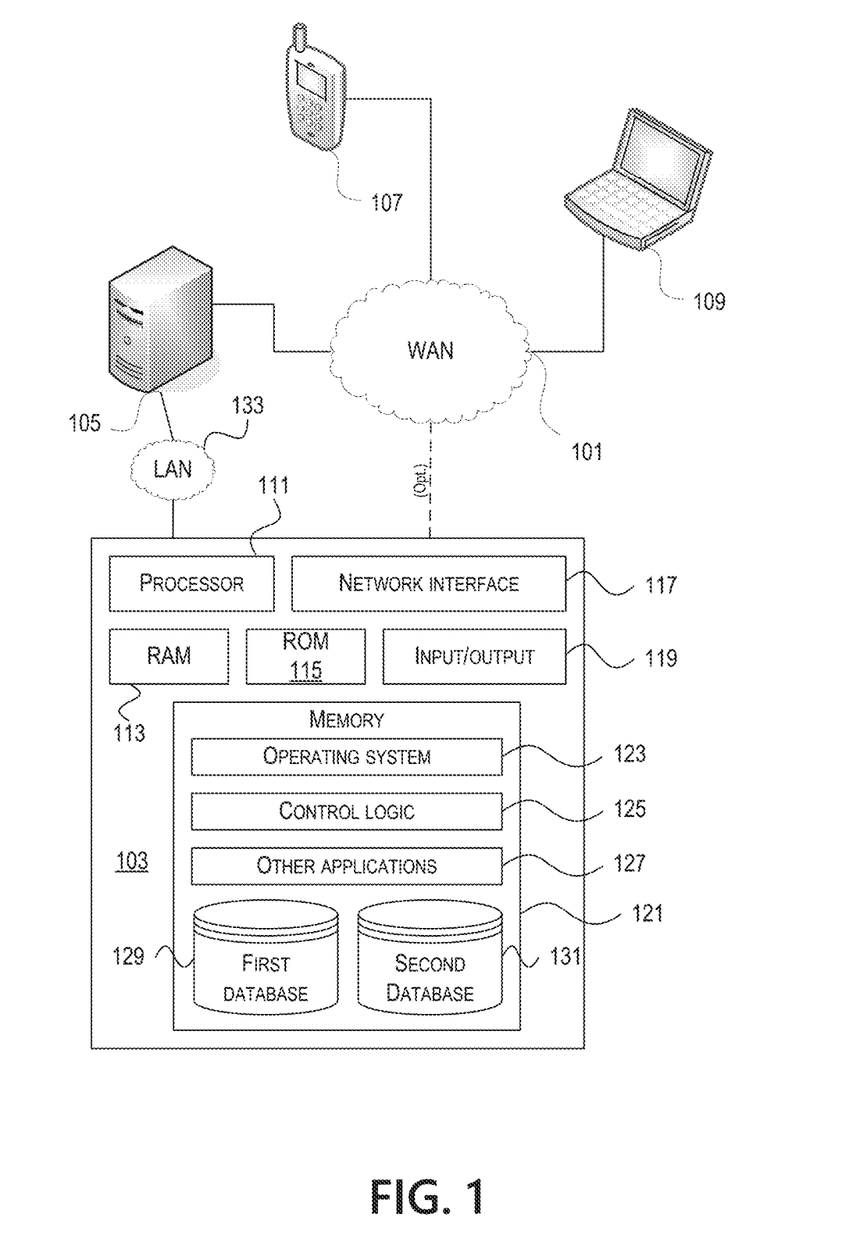
FIG. 1 depicts an example computer system architecture that may be used in accordance with one or more illustrative aspects described herein.

Computer software, hardware, and networks may be utilized in a variety of different system environments, including standalone, networked, remote-access (also known as remote desktop), virtualized, and/or cloud-based environments, among others. FIG. 1 illustrates one example of a system architecture and data processing device that may be used to implement one or more illustrative aspects described herein in a standalone and/or networked environment. Various network nodes 103, 105, 107, and 109 may be interconnected via a wide area network (WAN) 101, such as the Internet. Other networks may also or alternatively be used, including private intranets, corporate networks, local area networks (LAN), metropolitan area networks (MAN), wireless networks, personal networks (PAN), and the like. Network 101 is for illustration purposes and may be replaced with fewer or additional computer networks. A local area network 133 may have one or more of any known LAN topology and may use one or more of a variety of different protocols, such as Ethernet. Devices 103, 105, 107, and 109 and other devices (not shown) may be connected to one or more of the networks via twisted pair wires, coaxial cable, fiber optics, radio waves, or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and user devices 107, 109. Data server 103 provides overall access, control and administration of databases and control software for performing one or more illustrative aspects describe herein. Data server 103 may be connected to web server 105 through which users interact with and obtain data as requested. Alternatively, data server 103 may act as a web server itself and be directly connected to the Internet. Data server 103 may be connected to web server 105 through the local area network 133, the wide area network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. User devices 107, 109 may be used in concert with data server 103 to access data stored therein, or may be used for other purposes. For example, from user device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 for executing computer executable instructions and/or for otherwise controlling overall operation of the data server 103. Data server 103 may further include random access memory (RAM) 113, read only memory (ROM) 115, network interface 117, input/output interfaces 119 (e.g., keyboard, mouse, display, printer, etc.), and memory 121. Input/output (I/O) 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or might not be used in conjunction with aspects described herein. The control logic 125 may also be referred to herein as the data server software 125. Functionality of the data server software 125 may refer to operations or decisions made automatically based on rules coded into the control logic 125, made manually by a user providing input into the system, and/or a combination of automatic processing based on user input (e.g., queries, data updates, etc.).

Memory 121 may also store data used in performance of one or more aspects described herein, including a first database 129 and a second database 131. In some embodiments, the first database 129 may include the second database 131 (e.g., as a separate table, report, etc.). That is, the information can be stored in a single database, or separated into different logical, virtual, or physical databases, depending on system design. Devices 105, 107, and 109 may have similar or different architecture as described with respect to device 103. Those of skill in the art will appreciate that the functionality of data processing device 103 (or device 105, 107, or 109) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include computer-executable instructions, routines, programs, objects, components, data structures, etc. that perform particular tasks or implement particular abstract data types when executed by one or more processors in a computer or other device. The modules may be written in a source code programming language that is subsequently compiled for execution, or may be written in a scripting language such as (but not limited to) HyperText Markup Language (HTML) or Extensible Markup Language (XML). The computer-executable instructions may be stored on a computer readable medium such as a nonvolatile storage device. Any suitable computer readable storage media may be utilized, including hard disks, CD-ROMs, optical storage devices, magnetic storage devices, solid state storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware, and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Figure 2:
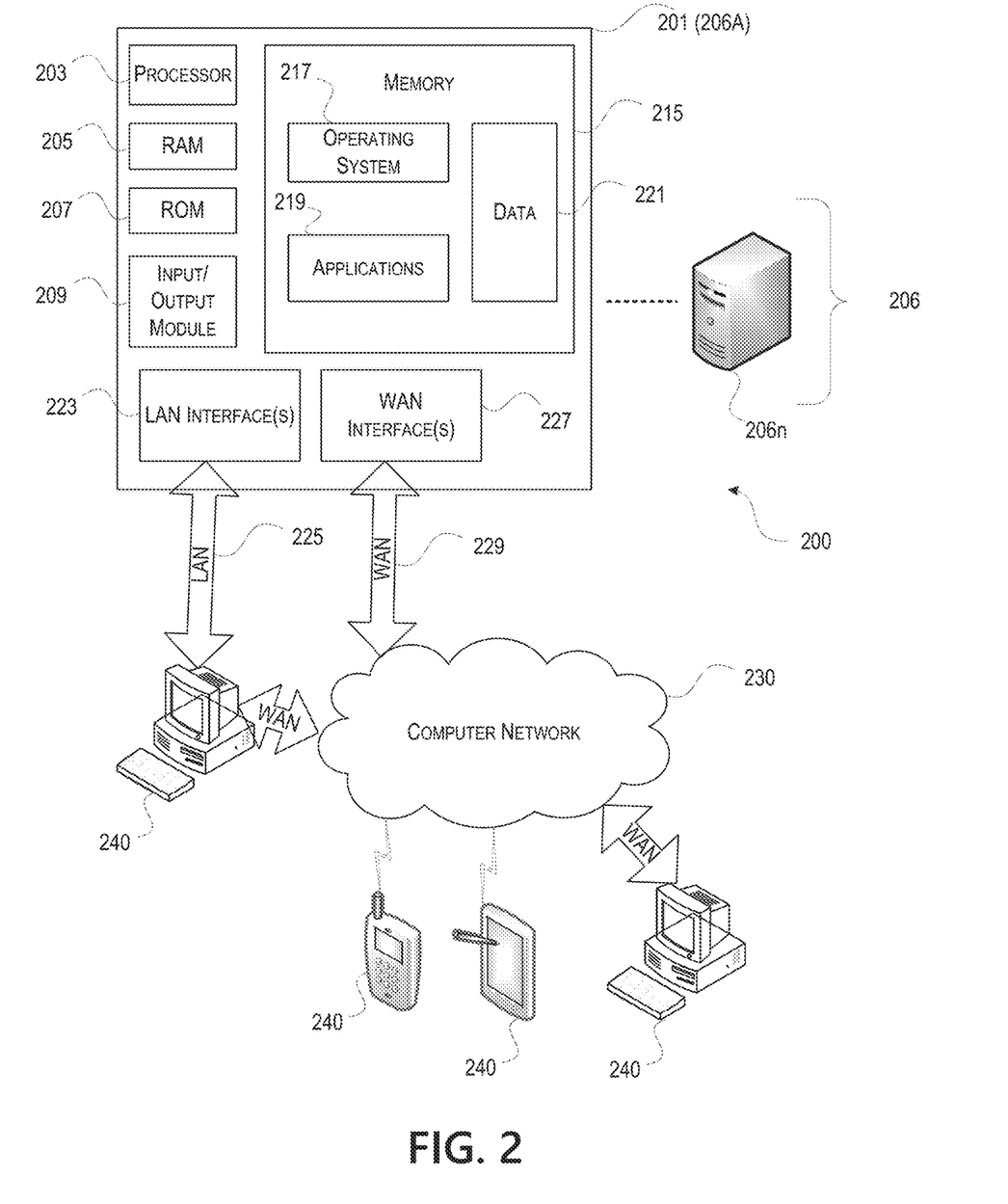
FIG. 2 depicts an example remote-access system architecture that may be used in accordance with one or more aspects described herein.

With further reference to FIG. 2, one or more aspects described herein may be implemented in a remote-access environment. FIG. 2 depicts an example system architecture including a computing device 201 in an illustrative computing environment 200 that may be used according to one or more illustrative aspects described herein. Computing device 201 may be used as a server 206a in a single-server or multi-server desktop virtualization system (e.g., a remote access or cloud system) and can be configured to provide virtual machines for user devices. The computing device 201 may have a processor 203 for controlling overall operation of the device 201 and its associated components, including RAM 205, ROM 207, Input/Output (I/O) module 209, and memory 215.

I/O module 209 may include a mouse, keypad, touch screen, scanner, optical reader, and/or stylus (or other input device(s)) through which a user of computing device 201 may provide input, and may also include one or more of a speaker for providing audio output and one or more of a video display device for providing textual, audiovisual, and/or graphical output. Software may be stored within memory 215 and/or other storage to provide instructions to processor 203 for configuring computing device 201 into a special purpose computing device in order to perform various functions as described herein. For example, memory 215 may store software used by the computing device 201, such as an operating system 217, application programs 219, and an associated database 221.

Computing device 201 may operate in a networked environment supporting connections to one or more remote computers, such as user devices 240. The user devices 240 may be personal computers, mobile devices, laptop computers, tablets, or servers that include many or all of the elements described above with respect to the computing device 103 or 201. In some arrangements, the user devices 240 may include a BYOD device, such as a BYOD mobile device, BYOD laptop computer, BYOD tablet, or the like. The network connections depicted in FIG. 2 include a local area network (LAN) 225 and a wide area network (WAN)

229, but may also include other networks. When used in a LAN networking environment, computing device 201 may be connected to the LAN 225 through a network interface or adapter 223. When used in a WAN networking environment, computing device 201 may include a modem or other wide area network interface 227 for establishing communications over the WAN 229, such as computer network 230 (e.g., the Internet). It will be appreciated that the network connections shown are illustrative and other means of establishing a communications link between the computers may be used. Computing device 201 and/or terminals 240 may also be mobile terminals (e.g., mobile phones, smartphones, personal digital assistants (PDAs), notebooks, etc.) including various other components, such as a battery, speaker, and antennas (not shown).

Aspects described herein may also be operational with numerous other general purpose or special purpose computing system environments or configurations. Examples of other computing systems, environments, and/or configurations that may be suitable for use with aspects described herein include, but are not limited to, personal computers, server computers, hand-held or laptop devices, multiprocessor systems, microprocessor-based systems, set top boxes, programmable consumer electronics, network personal computers (PCs), minicomputers, mainframe computers, distributed computing environments that include any of the above systems or devices, and the like.

As shown in FIG. 2, one or more user devices 240 may be in communication with one or more servers 206a-206n (generally referred to herein as "server(s) 206"). In one embodiment, the computing environment 200 may include a network appliance installed between the server(s) 206 and user devices 240. The network appliance may manage user device/server connections, and in some cases can load balance user device connections amongst a plurality of backend servers 206.

The user devices 240 may in some embodiments be referred to as a single user device 240 or a single group of user devices 240, while server(s) 206 may be referred to as a single server 206 or a single group of servers 206. In one embodiment, a single user device 240 communicates with more than one server 206, while in another embodiment a single server 206 communicates with more than one user device 240. In yet another embodiment, a single user device 240 communicates with a single server 206.

A user device 240 can, in some embodiments, be referenced by any one of the following non-exhaustive terms: user device(s), client machine(s); client(s); client computer (s); client device(s); client computing device(s); local machine; remote machine; client node(s); endpoint(s); or endpoint node(s). The server 206, in some embodiments, may be referenced by any one of the following non-exhaustive terms: server(s), local machine; remote machine; server farm(s), or host computing device(s).

In one embodiment, the server 206 may execute or otherwise include a virtual machine. The virtual machine may be any virtual machine, while in some embodiments the virtual machine may be any virtual machine managed by a Type 1 or Type 2 hypervisor, for example, a hypervisor developed by Citrix Systems, IBM, VMware, or any other hypervisor. In some aspects, the virtual machine may be managed by a hypervisor, such as a hypervisor executing on the server 206.

Some embodiments include a user device 240 that displays application output generated by an application remotely executing on a server 206 or other remotely located machine. In these embodiments, the user device 240 may execute a virtual machine receiver program or application to display the output in an application window, a browser, or other output window. The application remotely executing on the server 206 may be interchangeably referred to as a virtualized application, a cloud-based application, and/or a remotely-executed application. The application remotely executing on the server 206 may be a remote desktop or an application that generates or presents a desktop. A remote desktop may include a graphical shell providing a user interface for an instance of an operating system in which local and/or remote applications can be integrated. Sessions for the application remotely executing on the server 206 may be established for one or more user devices 240. Applications, as used herein, are programs that execute after an instance of an operating system (and, optionally, also the desktop) has been loaded.

The server 206, in some embodiments, uses a remote presentation protocol or other program to send data to a thin-client or remote-display application executing on the user device to present display output generated by an application executing on the server 206. The thin-client or remote-display protocol can be any one of the following non-exhaustive list of protocols: the Independent Computing Architecture (ICA) protocol developed by Citrix Systems, Inc. of Ft. Lauderdale, Florida; or the Remote Desktop Protocol (RDP) manufactured by the Microsoft Corporation of Redmond, Washington.

A remote computing environment may include more than one server 206a-206n such that the servers 206a-206n are logically grouped together into a server farm 206, for example, in a cloud computing environment. The server farm 206 may include servers 206 that are geographically dispersed while logically grouped together, or servers 206 that are located proximate to each other while logically grouped together. Geographically dispersed servers 206a-206n within a server farm 206 can, in some embodiments, communicate using a WAN (wide), MAN (metropolitan), or LAN (local), where different geographic regions can be characterized as: different continents; different regions of a continent; different countries; different states; different cities; different campuses; different rooms; or any combination of the preceding geographical locations. In some embodiments the server farm 206 may be administered as a single entity, while in other embodiments the server farm 206 can include multiple server farms.

In some embodiments, a server farm may include servers 206 that execute a substantially similar type of operating system platform (e.g., WINDOWS, UNIX, LINUX, iOS, ANDROID, etc.) In other embodiments, server farm 206 may include a first group of one or more servers that execute a first type of operating system platform, and a second group of one or more servers that execute a second type of operating system platform.

Server 206 may be configured as any type of server, as needed, e.g., a file server, an application server, a web server, a proxy server, an appliance, a network appliance, a gateway, an application gateway, a gateway server, a virtualization server, a deployment server, a Secure Sockets Layer (SSL) VPN server, a firewall, a web server, an application server or as a master application server, a server executing an active directory, or a server executing an application acceleration program that provides firewall functionality, application functionality, or load balancing functionality. Other server types may also be used.

Some embodiments include a first server 206a that receives requests from a user device 240, forwards the request to a second server 206b (not shown), and responds to the request generated by the user device 240 with a response from the second server 206*b* (not shown.) First server 206*a* may acquire an enumeration of applications available to the user device 240 as well as address information associated with an application server 206 hosting an application identified within the enumeration of applications. First server 206*a* can then present a response to the user device's request using a web interface, and communicate directly with the user device 240 to provide the user device 240 with access to an identified application. One or more user devices 240 and/or one or more servers 206 may transmit data over network 230, e.g., network 101.

Trusting a Certificate Based on One or More Remote User Sessions

Figure 3:
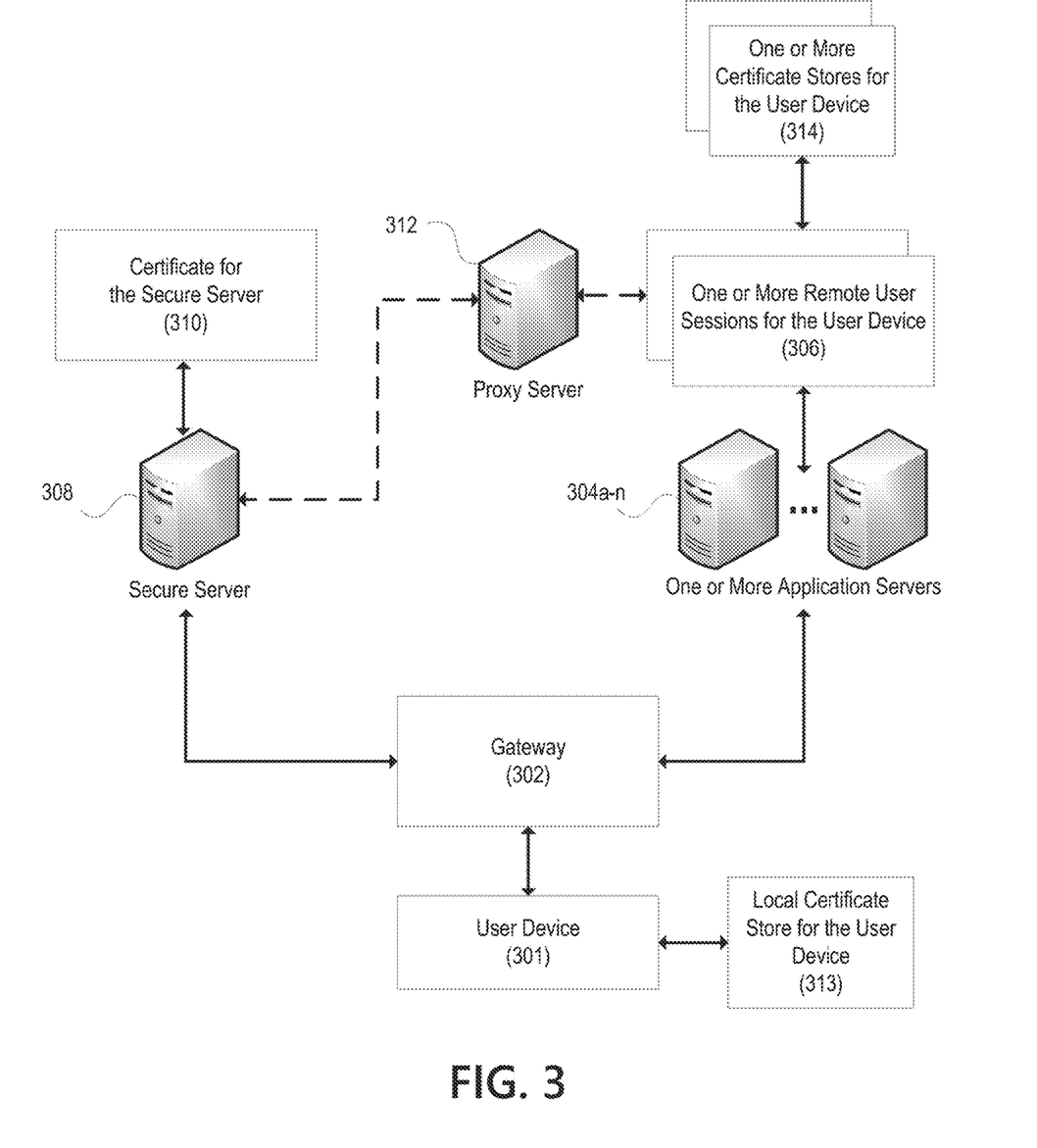
FIG. 3 depicts an example block diagram that enables a user device to establish a secure connection based on a determination, performed by one or more remote user sessions, as to whether a certificate for the secure connection is trusted.

FIG. 3 depicts an example block diagram that enables a user device to establish a secure connection based on a determination, performed by one or more remote user sessions, as to whether a certificate for the secure connection is trusted. FIG. 3 includes a user device 301; a gateway 302; one or more application servers 304*a-n*; a secure server 308; and, optionally, a proxy server 312. Each the client device 301, the gateway 302, the one or more application servers 304*a-n*, the secure server 308, and the proxy server 312 may be implemented the same as, or similar to, the devices discussed above in connection with FIGS. 1 and 2 (e.g., the same or similar to the devices 103, 105, 107, and/or 109 of FIG. 1, the user device 240 of FIG. 2, and/or server 206 of FIG. 2). In some variations, the gateway 302, the one or more application servers 304*a-n*, and the proxy server 312 may be devices and/or resources that are managed by an enterprise (referred interchangeably herein as enterprise devices and/or enterprise resources). The user device 301 may be a BYOD device that can be connected to the various enterprise devices and/or enterprise resources.

The secure server 308 may be configured to send data via a secure connection such as an SSL connection or a Datagram Transport Layer Security (DLTS) connection. In some variations, the secure server 308 may be a web server configured to send web data (e.g., text, graphics, video, audio, etc.) via the secure connection. The web data may be for display via a browser installed on an end point device, such as a browser installed on the user device 301. The secure server 308 may or may not be managed by the enterprise. As such, the secure server 308 may or may not be one of the enterprise devices and/or enterprise resources.

The gateway 302 may be configured to manage access to the enterprise resources, such as the one or more application servers 306*a-n*. The gateway 302 may enable a user device to sign in (e.g., via single sign-on (SSO) functionality) to enable access to the enterprise resources. The gateway 302 may be configured to provide virtual private network (VPN) functionality, ICA functionality, virtual server functionality, proxy server functionality, and/or a combination thereof. The gateway 302 may be a CITRIX Gateway.

The one or more application servers 304*a-n* may be hosting, or otherwise executing, one or more remote user sessions 304*a-n* for the user device 301. One or more remote user sessions may include one or more sessions for a virtualized application, one or more sessions for a cloud-based application, and/or one or more sessions for a remote desktop. Each of the one or more remote user sessions may be for the user device (e.g., a remote user session of a virtualized application being remotely executed for the user device, a remote user session of a cloud-based application being remotely executed for the user device, and/or a remote user session of a remote desktop being remotely executed for the user device). The one or more remote user sessions 304*a-n* may have been previously established for the user device at a time when the user device 301 attempts to establish a secure connection with the secure server 308.

The example block diagram of FIG. 3 shows a simplified example of the computing environment in which the user device 301 may establish a secure connection with the secure server 308. The computing environment, in some variations, may include additional devices, software services, computer networks, and the like, which are not depicted in FIG. 3. For example, the user device 301, when communicating with the gateway 302 may send/receive data over a WAN and/or one or more LANs. As another example, the gateway 302, when communicating with the secure server 308 and/or the one or more application servers 304*a-n*, may send/receive data over a WAN and/or one or more LANS. As yet another example, the computing environment may include one or more firewall devices and/or firewall services (e.g., before the gateway 302, before each of the one or more application servers 304*a-n*, and/or before the secure server 308).

The example block diagram of FIG. 3 provides two examples as to how the user device 301 may establish a secure connection with the secure server 308. The first example depicted in FIG. 3 is a secure connection for communication between the user device 301 and to the secure server 308 that is established via the gateway 302. The first example is shown by a solid line representing the ability for the gateway 302 and the secure server 308 to communicate with each other. In variations of this first example, the user device 301 may connect to the gateway 301 (e.g., based on the VPN functionality of the gateway 302) and may establish a direct SSL connection with the secure server 308. The second example depicted in FIG. 3 for communication between the user device 301 and to the secure server 308 is a secure connection that is established via the proxy server 312. The second example is shown by a dashed line representing the ability for the proxy server 312 to communicate with the secure server 308 and at least one of the one or more remote user sessions 306 for the user device 301. In variations of this second example, the user device 301 may, via the gateway 302 (e.g., based on ICA functionality) and using one of the one or more application servers 306*a-n*, establish a remote user session of a web browser application. As web content is browsed, the remote user session may cause an SSL connection to be established for communication between the user device 301 and the secure server 308 via the remote user session for the web browser application and via the proxy server 312. The proxy server 312 may be a CITRIX Browser Content Redirection (BCR) proxy server. The secure connection of the first example may be referred to as a direct secure connection. The secure connection of the second example may be referred to as a proxied secure connection. However, for simplicity, the examples discussed throughout this disclosure will continue to refer simply to a secure connection. The secure connection of the examples could interchangeably be a direct secure connection or a proxied secure connection.

As an introductory example of how the remote user sessions may be used to determine whether a certificate for a secure connection is trusted, the user device 301 may have previously established the one or more remote user sessions 306 and may attempt to establish a secure connection (e.g., an SSL connection or DTLS connection) with the secure server 308. In this way, the user device 301 may send one or more first messages to attempt to establish the secure connection with the secure server. This attempt to establish a secure connection may be interchangeably referred to as an initiation of an establishment process (e.g., an establishment process for an SSL connection or an DTLS connection) and/or an initiation of a secure connection handshake process (e.g., an SSL handshake process or a DTLS handshake process). For variations that attempt to establish an SSL connection, this first message may be a "client hello" message that is the same as, or similar to, those used in an SSL handshake process. A "client hello" message may include, among other things, cryptographic information (e.g., an indication of an SSL version), a first random byte string, and/or an indication of one or more data compression methods supported by the user device 301. In response to the first message, the secure server 308 may respond with a message that includes the certificate 310 for the secure server 308. For variations that attempt to establish an SSL connection, this second message may be a "server hello" message that is the same as, or similar to, those used in an SSL handshake process. A "server hello" message may include, among other things, one or more parameters for the secure connection, a second random byte string, and the certificate of the secure server 308.

Based on receiving the second message, the user device 301 may perform a local determination as to whether the certificate 310 is trusted. This local determination may be the same as, or similar to, a user device attempting to verify a certificate, as performed during an SSL handshake process. For example, the local certificate store 313 of the user device may searched for any host or intermediate CA certificate that was used to sign the certificate 310 for the secure server 308. If a host or intermediate CA certificate was found, the user device 301 may locally determine that the certificate 310 for the secure server 308 is trusted and may proceed to continue the establishment process for the secure connection. However, if a host or intermediate CA certificate was not found, the user device 301 may locally determine that the certificate 310 for the secure server is not trusted and may cause performance of one or more remote attempts to determine whether the certificate 310 is trusted. One example of a remote attempt may, for example, include the user device 301 having at least one of the one or more remote user sessions 306 perform its own determination as to whether the certificate 310 for the secure server 308 is trusted. A remote attempt to determine whether the certificate is trusted may be interchangeably referred to as a remote attempt for determining trust in the certificate. Further, whether performed locally at the user device 301 or at devices/resources that are different from the user device 301 (e.g., a remote attempt performed by a remote user session), determining whether a certificate is trusted may be interchangeably referred as determining whether the certificate is verified.

Whether the user device 301 causes performance of one or more remote attempts for determining trust in the certificate 310 may be based on characteristics of the secure server 308 and/or characteristics of the one or more remote user sessions 306. The following provides some examples of the characteristics that may be used as a basis for causing performance of one or more remote attempts. The user device 301 may cause performance of a remote attempt if the address of the secure server 308 is included on a list of servers to which remote user sessions may be able to determine trust. This list of servers may be stored on the user device 301 and may be managed by the enterprise (e.g., updates, changes, and/or modifications to the list of servers may be pushed to the user device 301 via the gateway 302). The user device 301 may cause performance of a remote attempt if a list of remote user sessions indicates at least one remote user session currently exists for the user device 301. This list of remote user sessions may be stored on the user device 301 and may be updated as the user device 301 establishes and/or closes the one or more remote user sessions 306. In this way, the user device 301 may, based on the list of remote user sessions, be able to determine whether any remote user sessions currently exist or not. The user device 301 may cause performance of a remote attempt if a currently existing remote user session communicates with the user device 301 via an additional secure connection (e.g., a TLS connection). The list of remote user sessions may, for each currently existing remote user session, store an indication as to whether the currently existing remote user session communicates with the user device 301 via an additional secure connection. The user device 301 may cause performance of a remote attempt if a currently existing remote user session is on a list of trusted remote user sessions. The list of trusted remote user sessions may be stored on the user device 301 and may be managed by the enterprise (e.g., updates, changes, and/or modifications to the list of trusted remote user sessions may be pushed to the user device 301 via the gateway 302). The user device 301 may cause performance of a remote attempt based on a combination of the above examples (e.g., if the address of the secure server 308 is found in the list of servers and there currently exists a remote user session that is securely connected to the user device 301 and is also on the list of trusted remote user sessions). Further details regarding the additional attempts will be provided in connection with FIGS. 4 and 5.

If a remote user session is to perform a remote attempt to determine whether the certificate 310 is trusted, the user device 301 may, via the gateway 302 and via any connection established from communication between the user device 301 and the remote user session, send the certificate 310 to the remote user session. Upon receiving the certificate 310, the remote user session may determine whether the certificate 310 is trusted. This determination by the remote user session may be similar to a device attempting to verify a certificate, as performed during an SSL handshake process. For example, a remote user session may include a certificate store 314 for the user device 301 that includes host or intermediate CA certificates that are to be trusted by the user device 301. To determine whether the certificate 310 is trusted, the remote user session may search the certificate store 314 for any host or intermediate CA certificate that was used to sign the certificate 310. The remote user session may send, via the gateway 302 and via any connection established for communication between the user device 301 and the remote user session, data indicating the results of the remote attempt to the user device 301. This certificate store 314 may be managed by the enterprise (e.g., updates, changes, and/or modifications to the certificate store 314 may be managed by policies and/or operators of the enterprise). In this way, the enterprise may enable the user device 301 to trust additional certificates without modifying the local certificate store 313 of the user device 301 and/or without requiring a user to manually install host or intermediate CA certificates on the user device 301.

Upon receiving the data indicating the results of the remote attempt, the user device 301 may proceed based on whether the data indicates the certificate 310 is trusted or is not trusted. For example, if the data indicates that the certificate 310 is trusted, the user device 301 may complete the establishment process for the secure connection with the secure server 308 (e.g., by completing the SSL handshake process). If the data indicates that the certificate 310 is not trusted, the user device 301 may stop the establishment process for the secure connection. If the data indicates that the certificate 310 is not trusted, the user device 301 may display a message to a user indicating the certificate 310 is not trusted and request the user's permission to proceed with establishing the secure connection. Further, if the data indicates that the certificate 310 is not trusted, the user device 301 may indicate establishment of the secure connection has failed. Yet further, if the data indicates that the certificate 310 is not trusted, the user device 301 may determine whether another remote attempt to determine whether the certificate 310 is trusted should be performed. Further details, variations, and/or alternatives, will be discussed in connection with FIGS. 4 and 5.

Figure 4:
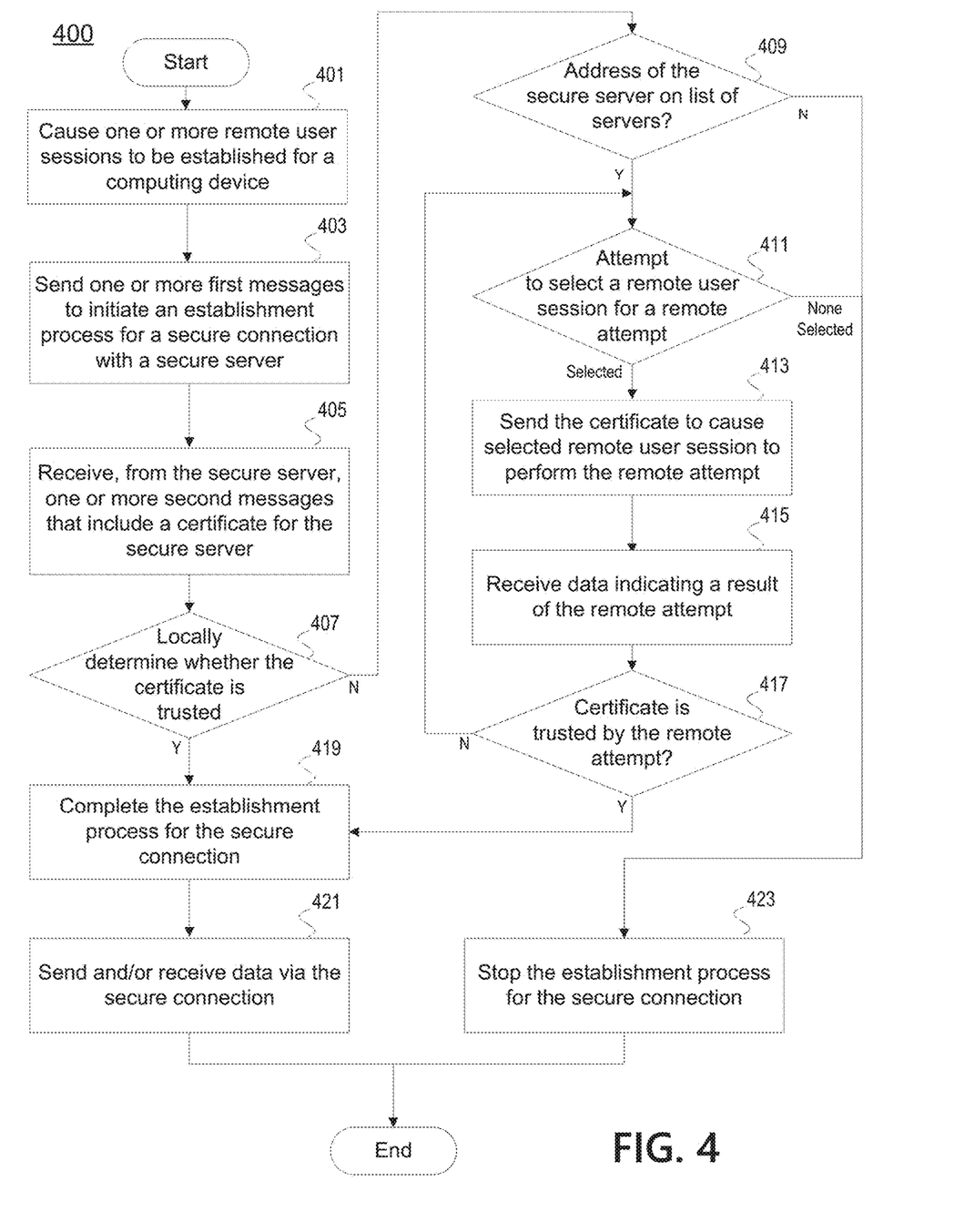
FIG. 4 depicts example method for establishing a secure connection based on a determination, performed by one or more remote user sessions, as to whether a certificate for the secure connection is trusted.

FIG. 4 depicts example method 400 for establishing a secure connection based on a determination, performed by one or more remote user sessions, as to whether a certificate for the secure connection is trusted. The method may be performed by a user device (e.g., user device 301 of FIG. 3). For simplicity, the steps of FIG. 4 will be discussed in terms of being performed by a computing device.

At step 401, a computing device may, via one or more communications with a gateway (e.g., gateway 302 of FIG. 3), cause one or more remote user sessions to be established for the computing device. The one or more remote user sessions (e.g., the one or more remote user sessions 306 of FIG. 3) may be executed by one or more application servers (e.g., the application servers 304*a-n* of FIG. 3), may be executed by one or more enterprise resources, and/or some other computing device (e.g., one or more devices in a virtualized computing environment). The one or more remote user sessions, for example, may include one or more sessions for a virtualized application, one or more sessions for a cloud-based application, and/or one or more sessions for a remote desktop.

As the one or more remote user sessions are established, the computing device, based on the one or more communications with the gateway, may update a list of remote user sessions. After establishing the one or more remote user sessions, the list of remote user sessions may, among other things, indicate that the one or more remote user sessions currently exist for the computing device. The list of remote user sessions may also indicate additional information for each of the one or more remote user sessions. For example, the list of remote user sessions may, for each of the one or more remote user sessions, indicate whether the remote user session is capable of performing a remote attempt for determining trust in a certificate (e.g., a remote user session for a web browser may be capable of performing a remote attempt, but remote user session for a word processing application may not be capable of performing a remote attempt); indicate whether the computing device communicates with the remote user session via a secure connection; and/or indicate whether the remote user session has performed a remote attempt (e.g., as the computing device establishes a remote user session, the list may be initialized so that none of the one or more remote user sessions have performed a remote attempt).

Additionally, as the one or more remote user sessions are established, the application servers, the gateway, and/or other enterprise resources may communicate and/or cause at least one of the one or more remote user sessions to be configured with a certificate store for the computing device (e.g., certificate store 313 of FIG. 3). The certificate store for the computing device may be a copy of, or otherwise based on, a reference certificate store managed by the enterprise. For example, the enterprise may maintain a reference certificate store that is used for any computing device that connects via the gateway (e.g., a remote user is configured based on a reference certificate store that is common to all computing devices) and/or that is used for particular user groups (e.g., a remote user session is configured based on a reference certificate store associated with a user group assigned to the computing device). Updates, changes, and/or modifications to the reference certificate store may be under the control of an operator of the enterprise. In this way, the enterprise may modify a reference certificate store and/or the certificate store of a remote user session without modifying the local certificate store of the computing device and/or without requiring a user to manually install host or intermediate CA certificates on the computing device.

At step 403, the computing device may send one or more first messages to a secure server. By sending the one or more first messages, the computing device may be initiating an establishment process for a secure connection (e.g., an SSL connection or a DTLS connection) with a secure server (e.g., the secure server 308 of FIG. 3), by sending. For example, as a first message, the computing device may send, to the secure server, a "client hello" message of an SSL handshake process. The one or more first messages may be sent to the secure server via a gateway (e.g., gateway 302 of FIG. 3) and/or via a proxy server (e.g., proxy server 312 of FIG. 3). The one or more first messages may include information for establishing the secure connection, such as cryptographic information and other information included in a "client hello" message of an SSL handshake process or similar type of message for a different handshake process (e.g., a DTLS handshake process).

The one or more first messages may be sent based on user interaction. For example, a user of the computing device may interact with a browser application (e.g., executing locally at the computing device or executing as one of the remote user sessions established at step 401) or some other application. The interaction may cause the one or more first messages to be sent to the secure server. Some examples of the interactions that may cause the one or more first messages to be sent to the secure server, in a browser address bar, a particular web address of the secure sever (e.g., the user may input "https://www.web.address"); the user may click on a web link that redirects the browser application to display a web page provided by the secure server; and the user may press on a button being displayed in an email application and that press may cause a web page to be loaded in a browser application. The interaction may also cause the computing device to receive the address of the secure server (e.g., by input from the user; based on a link or other user interface element that is associated with the address of the secure server; and/or based on a domain name service that provides the address of the secure server).

At step 405, the computing device may receive, from the secure server, one or more second messages that include a certificate for the secure server. The certificate (e.g., certificate 310 of FIG. 3) may include data associated with the secure connection, such as a public key of the secure server. The certificate may be signed by one or more root or intermediate CA certificates. The one or more second messages may be sent by the secure server as a response to the one or more first messages. For example, the certificate for the secure server may be received in a "server hello" message of an SSL handshake process and may be a response to the "client hello" message sent at step 403. The one or more second messages may be received by the computing device via a gateway (e.g., gateway 302 of FIG. 3) and/or via a proxy server (e.g., proxy server 312 of FIG. 3). The one or more second messages may include information for establishing the secure connection, such as one or more parameters for the secure connection and other information included in a "server hello" message of an SSL handshake process or similar type of message for a different handshake process (e.g., a DTLS handshake process).

At step 407, the computing device may perform a local determination as to whether the certificate for the secure server is trusted. This local determination may be the same as, or similar to, a computing device attempting to verify a certificate, as performed during an SSL handshake process. For example, the computing device may search its local certificate store (e.g., local certificate store 313 of FIG. 3) to determine if any of the host or intermediate CA certificates in the local certificate store were used to sign the certificate for the secure server. If a host or intermediate CA certificate was found, the computing device may locally determine that the certificate for the secure server is trusted and may proceed to step 419. However, if a host or intermediate CA certificate was not found, the computing device may proceed to determine whether to cause performance of one or more remote attempts for determining trust in the certificate, which begins at step 409.

Steps 409-411 show one example arrangement in which the computing device may determine whether to cause performance of one or more remote attempts for determining trust in the certificate. In particular, steps 409-411 show two steps that test various criteria that may be satisfied before causing performance of the one or more remote attempts. These steps, and their order, are just one example of how the computing device may determine whether to cause performance of one or more remote attempts. Steps could be removed (e.g., step 409 may be removed) or added (e.g., a new step could be added that tests a different criterion than those depicted by steps 409-411), and/or their order could change. Additionally, for simplicity, a remote attempt for determining trust in the certificate may be referred interchangeably below as a remote attempt.

At step 409, the computing device may determine whether the address of the secure server is on a list of servers. The list of servers may include addresses of servers to which remote user sessions are able to determine trust. The list of servers may be stored on the computing device and may be managed by an enterprise (e.g., updates, changes, and/or modifications to the list of servers may be pushed to the computing device via the gateway, and under the control of a policy and/or operator of the enterprise). The list of servers may include addresses that are external to the enterprise (e.g., a web server hosted by a third party different from the enterprise) and/or addresses that are internal to the enterprise (e.g., a web sever hosted by the enterprise and/or as one of the enterprise resources accessible via a gateway). If the address of the secure server is found on the list of servers, the method may proceed to step 411. If the address of the secure server is not found on the list of servers, the method may proceed to step 423.

At step 411, the computing device may attempt to select a remote user session to perform a remote attempt, remote user sessions for the computing device. The attempt may be based on criteria that must be satisfied by a remote user session for selection. For example, selection may be based on the list of remote user sessions (discussed above in connection with step 401). In some variations, to be selected, a remote user session must be currently existing (e.g., the remote user session must be on the list of remote user sessions). In some variations, to be selected, a remote user session must be capable of performing a remote attempt for determining trust in a certificate (e.g., the list of remote user sessions must indicate the remote user session is capable of performing a remote attempt). In some variations, to be selected, a remote user session must communicate with the computing device via its own secure connection (e.g., the list of remote user sessions must indicate the remote user session communicates with the computing device via its own secure connection). In some variations, to be selected, a remote user session must have not performed a remote attempt for the certificate of the secure server (e.g., the list of remote user sessions must indicate the remote user session has not performed a remote attempt).

As another example, selection may be based on a list of trusted remote user sessions. The list of trusted remote user session may include an indication of which remote user sessions are trusted to perform a remote attempt for the computing device. In some variations, to be selected, a remote user session must be on the list of trusted remote user sessions. The list of trusted remote user sessions may be stored on the computing device and may be managed by the enterprise (e.g., updates, changes, and/or modifications to the list of trusted remote user sessions may be pushed to the computing device via a gateway).

In some instances, selection may result in plural remote user sessions satisfying the criteria for selection. The computing device may select one of the plural remote user sessions based on various schemes. For example, the computing device may select one of the plural remote user sessions in a randomized fashion. As another example, the computing device may select one of the plural remote user sessions based on a priority scheme. One particular priority scheme may prioritize for selection any remote user session associated with the secure connection. As one particular example, the secure connection for communication between the computing device and the secure server may be a proxied secure connection via a proxy server (e.g., proxy server 312 of FIG. 3). When the establishment process for the proxied secure connection is initiated, a remote user session (e.g., a remote user session for a web browser) may relay, to the secure server via the proxy server, the one or more first messages that initiate the establishment process with the secure server. An indication may be sent, to the computing device and via the gateway, of which remote user session relayed the one or more first messages to the secure server. In this way, the computing device is able to prioritize selection of which remote user session relayed the one or more first messages. The computing device may, based on receiving the indication, update the list of remote user sessions to indicate which remote user sessions have prioritized selection for a remote attempt. In this way, the computing device may select one of the plurality remote user sessions based on an indication of priority included by the list of remote user sessions.

As yet another example, selection may be based on additional criteria associated with enterprise policy. For example, the enterprise may have a policy that only a threshold number of remote attempts (e.g., a single remote attempt, three remote attempts, etc.) can be performed before stopping the establishment process for the secure connection. The computing device may count how many remote attempts have occurred (e.g., based indications in the list of remote user sessions as to whether the one or more remote user sessions have performed a remote attempt) and determine whether the count has met and/or exceeded the threshold. If the count has met and/or exceeded the threshold, the computing device may not select a remote user session. If the count has not met and/or exceeded the threshold, the computing device may select a remote user session (e.g., select a remote user session that satisfies any remaining criteria for selection). As another example, the enterprise may have a policy that only remote user sessions associated with the secure connection can perform remote attempts. The computing device may determine whether any other remote user sessions associated with the secure connection has yet to perform a remote attempt (e.g., based indications in the list of remote user sessions as to whether the one or more remote user sessions have performed a remote attempt and/or based on indications in the list of remote user sessions as to which remote user sessions have prioritized selection for a remote attempt). The additional criteria associated with enterprise policy may be stored on the computing device and may be managed by the enterprise (e.g., updates, changes, and/or modifications to the additional criteria may be pushed to the computing device via a gateway).

In some variations, the computing device may be configured to select a remote user session based on any, or all, of the above examples of criteria, schemes, and enterprise policies for selecting a remote user session. The above examples, however, are not exhaustive. The computing device may use yet further criteria, schemes, and enterprise policies as a basis for selecting a remote user session.

If the computing device was able to select a remote user session (e.g., at least one remote user session, the method may proceed to step 413. If the computing device was not able to select a remote user session (e.g., none of the one or more remote user sessions of step 401 were selected), the method may proceed to step 423. For simplicity, if the computing device was able to select a remote user session, the resulting selected will be referred to as a selected remote user session.

At step 413, the computing device may send the certificate to cause the selected remote user session to perform the remote attempt. The computing device may send the certificate to the selected remote user session via the gateway. Upon receiving the certificate, the selected remote user session may determine whether the certificate is trusted. This determination by the selected remote user session may be similar to a device attempting to verify a certificate, as performed during an SSL handshake process. For example, the selected remote user session may include a certificate store for the computing device (e.g., certificate store 314 of FIG. 3) that includes host or intermediate CA certificates that are to be trusted by the computing device. To determine whether the certificate is trusted, the selected remote user session may search this certificate store for any host or intermediate CA certificate that was used to sign the certificate 310. The selected remote user session may send, via the gateway and via any connection established for communication between the computing device and the selected remote user session, data indicating a result of the remote attempt to the computing device. The certificate store of the selected remote user session may be managed by the enterprise (e.g., updates, changes, and/or modifications to the certificate store may be managed by policies and/or operators of the enterprise). In this way, the enterprise may enable the computing device to trust additional certificates without modifying the local certificate store of the computing device and/or without requiring a user to manually install host or intermediate CA certificates on the computing device.

At step 415, the computing device may receive, from the selected remote user session and via the gateway, the data indicating the result of the remote attempt. The data may indicate whether the selected remote user sessions determined, by performing its remote attempt, the certificate is trusted.

At step 417, the computing device may determine whether the certificate is trusted by the remote attempt. This determination may be based on the data received at step 415. For example, if the data received at step 415 indicates the certificate is trusted, the method may proceed to step 419. If the data received at step 415 indicates the certificate is not trusted, the method may proceed to step 411, where another attempt may be made to select another remote user session for a remote attempt.

At step 419, the computing device may complete the establishment process for the secure connection. Completing the establishment process may include completing an SSL handshake process or similar handshake process for a different type of secure connection. In some variations, completing the establishment process for an SSL connection may include the computing device generating a random symmetric key, encrypting it using the public key of the secure server, and then sending the encrypted form of the random symmetric key to the secure server. Upon the secure server receiving the encrypted form of the random symmetric key and decrypting it into a decrypted form, the computing device and the secure server both know the random symmetric key, can encrypt/decrypt data using the symmetric key, and use the secure connection.

Completing the establishment process may also include reinitializing data used when determining whether to cause performance of one or more remote attempts for determining trust in the certificate. For example, the computing device may reinitialize the list of remote user sessions such that the list of remote user sessions indicates that none of the one or more remote user sessions have performed a remote attempt.

At step 421, the computing device may send and/or receive data via the secure connection. The computing device may encrypt/decrypt the data prior to sending/after receipt based on any encryption/decryption key determined when completing the establishment process of the secure connection (e.g., the random symmetric key resulting from completing an establishment process for an SSL connection). In some variations, the data may be request data and/or response data associated with a web page. For example, the computing device may send, vis the secure connection, one or more requests for web assets (e.g., text, graphics, video, audio, and the like). In response, the computing device may receive, from the secure server and via the secure connection, the requested web assets. The computing device may display these web assets (e.g., in a browser application executed locally by the computing device or as part of a display for a remote user session of a browser application).

At step 423, the computing device may stop the establishment process for the secure connection. Stopping the establishment process may include the computing device displaying a message to a user indicating the certificate for the secure server is not trusted and request the user's permission to proceed with establishing the secure connection. Stopping the establishment process may include the computing device displaying an indication that the establishment process for the secure connection has failed.

Stopping the establishment process may also include reinitializing data used when determining whether to cause performance of one or more remote attempts for determining trust in the certificate. For example, the computing device may reinitialize the list of remote user sessions such that the list of remote user sessions indicates that none of the one or more remote user sessions have performed a remote attempt.

Figure 5:
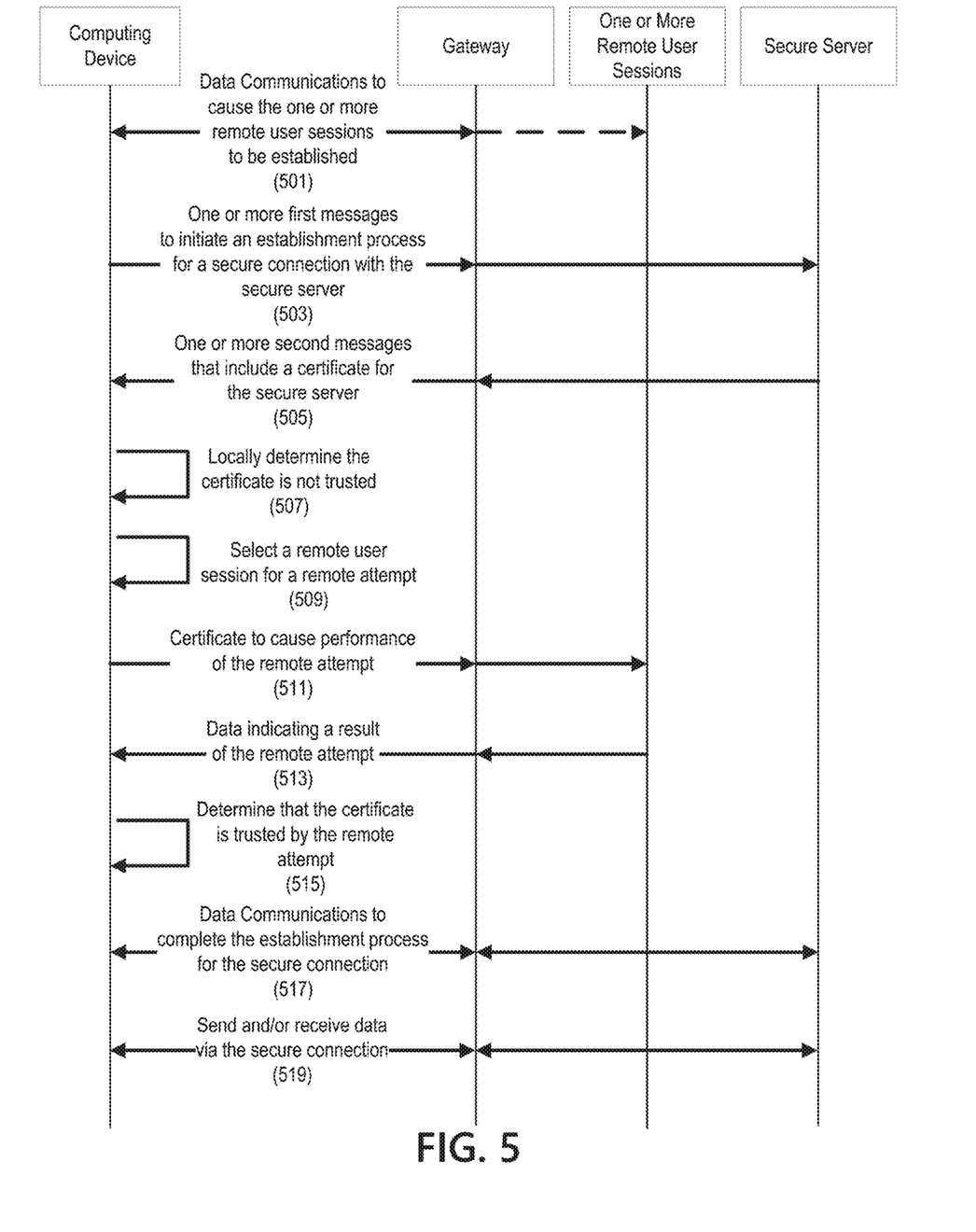
FIG. 5 shows an example method flow for establishing a secure connection based on a determination, performed by one or more remote user sessions, as to whether a certificate for the secure connection is trusted.

FIG. 5 depicts an example process flow for establishing a secure connection based on a determination, performed by one or more remote user sessions, as to whether a certificate for the secure connection is trusted. As compared to the example method 400 of FIG. 4, where one or more remote attempts can be attempted, FIG. 5 depicts an example where a single remote attempt is performed by a remote user session. That single remote attempt determines the certificate is trusted. Thereafter, based on the single remote attempt determining the certificate is trusted, a secure connection for communication between a computing device (e.g., user device 301 of FIG. 3) and a secure server (e.g., secure server 308 of FIG. 3) is established. Also included in the example flow is a gateway (e.g., gateway 302 of FIG. 3), and one or more remote user sessions (e.g., the one or more remote user sessions 306 of FIG. 3). The discussion of FIG. 5 will also refer to various steps of FIG. 4, where believed appropriate.

At item 501, the computing device may send and/or receive data communications with the gateway to establish the one or more remote user sessions. These data communications may be sent and/or received as a result of the computing device performing step 401 of FIG. 4. Based on the data communications, the gateway, as represented by the dashed line corresponding to item 401, may communicate with one or more application servers (e.g., application servers 304a-n of FIG. 3) to establish the one or more remote user sessions and/or configure at least one of the one or more remote user sessions with a certificate store for the computing device (e.g., certificate store 314 of FIG. 3).

At item 503, the computing device may send, to the secure server, one or more first messages to initiate an establishment process for a secure connection with the secure server. The one or more first messages may be sent as a result of the computing device performing step 403 of FIG. 4. As shown in FIG. 5, the one or more first messages are sent to the secure server via the gateway.

At item 505, the computing device may receive, from the secure server, one or more second messages that includes a certificate for the secure server. The one or more second messages may be sent by the secure server as a response to the one or more first messages. The one or more second messages may be received as a result of the computing device performing step 405 of FIG. 4. As shown in FIG. 5, the one or more second messages are received from the secure server via the gateway.

At item 507, the computing device may locally determine that the certificate is not trusted. This may result from the computing device performing step 407 of FIG. 4.

At item 509, the computing device may select a remote user session to perform a remote attempt for determining trust in the certificate. This may result from the computing device performing steps 409 and 411 of FIG. 4. Alternatively, this may result from the computing device performing step 411 of FIG. 4 and not performing step 409.

At item 511, the computing device may send, to the selected remote user session, the certificate. This may result from the computing device performing step 413 of FIG. 4. As shown in FIG. 5, the certificate is sent to the selected remote user session via the gateway.

At item 513, the computing device may receive, from the selected remote user session, data indicating a result of the remote attempt. In this example, the selected remote user session has performed its remote attempt and determined that the certificate is trusted. Accordingly, the data indicates that the certificate is trusted. This may result from the computing device performing step 415 of FIG. 4. As shown in FIG. 5, the data is received from the selected remote user session via the gateway.

At item 515, the computing device may determine that the certificate is trusted by the remote attempt. In this example, based the data received at item 513 indicating the certificate is trusted, the computing device determines that the certificate is trusted by the remote attempt. This may result from the computing device performing step 417 of FIG. 4.

At item 517, the computing device may send one or more data communications with the secure server to complete the establishment process for the secure connection. This may result from the computing device performing step 419 of FIG. 4. As shown in FIG. 5, the one or more data communications may be sent and/or received via the gateway.

At item 519, the computing device may send and/or receive data via the secure connection with the secure server. This may result from the computing device performing step 421 of FIG. 4. A shown in FIG. 5, the data sent and/or received via the secure connection is also via the gateway. However, the gateway, based on the secure connection, may not be able to encrypt and/or decrypt the data sent via the secure connection.

Although the subject matter has been described in language specific to structural features and/or methodological acts, it is to be understood that the subject matter defined in the appended claims is not necessarily limited to the specific features or acts described above. Rather, the specific features and acts described above are described as example implementations of the following claims.

What is claimed is:

1. A method comprising:
   causing, by a computing device and based on one or more first data communications with a gateway, one or more remote user sessions to be established for the computing device;
   sending, by the computing device and to a secure server, one or more first messages to initiate an establishment process for a secure connection with the secure server;
   receiving, by the computing device and from the secure server, one or more second messages that include a certificate for the secure server;
   based on a local determination, by the computing device, that the certificate is not trusted, selecting, by the computing device and from the one or more remote user sessions, a remote user session that is to perform a remote attempt for determining trust in the certificate;
   sending, by the computing device and to the remote user session, the certificate to cause performance of the remote attempt;
   receiving, by the computing device and from the remote user session, data indicating a result of the remote attempt;
   determining, by the computing device and based on the data indicating the result of the remote attempt, that the certificate is trusted by the remote attempt;
   based on determining that the certificate is trusted by the remote attempt, completing, by the computing device and based on one or more second data communications with the secure server, the establishment process for the secure connection; and
   sending and/or receiving, by the computing device, data via the secure connection.

2. The method of claim 1, wherein the local determination that the certificate is not trusted is performed based on a local certificate store of the computing device; and wherein causing the one or more remote user sessions to be established is performed by the remote user session being configured with a certificate store for the computing device.

3. The method of claim 1, further comprising determining that an address of the secure server is on a list of servers stored by the computing devices; and
wherein the selecting is performed based on determining that the address of the secure server is on the list of servers.

4. The method of claim 1, wherein the selecting is performed based on an indication that the remote user session is capable of performing the remote attempt.

5. The method of claim 1, wherein the selecting is performed based on an indication that the remote user session communicates with the computing device via second secure connection.

6. The method of claim 1, wherein the selecting is performed based on an indication that the remote user session has not performed the remote attempt.

7. The method of claim 1, wherein the selecting is performed based on a determination that the remote user session is on a list of trusted remote user sessions that is managed by an enterprise associated with the gateway.

8. The method of claim 1, wherein the selecting is performed based on a set of criteria, wherein the remote user session is one of a plurality of remote user sessions that satisfy the set of criteria, and wherein the remote user session is selected from the plurality of remote user sessions based on an indication, received via the gateway, that the remote user session relayed the one or more first messages to the secure server.

9. The method of claim 1, wherein the secure connection is a Secure Sockets Layer (SSL) connection.

10. The method of claim 1, wherein the computing device is a bring-your-own-device (BYOD) device configured to connect with one or more enterprise resources associated with an enterprise; and
wherein the gateway is associated with the enterprise.

11. The method of claim 1, wherein the steps of claim 1 are performed without modifying a local certificate store of the computing device.

12. The method of claim 1, wherein the steps of claim 1 are performed without a user manually installing host or intermediate CA certificates on the computing device.

13. A computing device comprising:
one or more processors; and
memory storing executable instructions that, when executed by the one or more processors, cause the computing device to:
cause, based on one or more first data communications with a gateway, one or more remote user sessions to be established for the computing device;
send, to a secure server, one or more first messages to initiate an establishment process for a secure connection with the secure server;
receive, from the secure server, one or more second messages that include a certificate for the secure server;
based on a local determination, performed by the computing device, that the certificate is not trusted, select, from the one or more remote user sessions, a remote user session that is to perform a remote attempt for determining trust in the certificate;
send, to the remote user session, the certificate to cause performance of the remote attempt;
receive, from the remote user session, data indicating a result of the remote attempt;
determine, based on the data indicating the result of the remote attempt, that the certificate is trusted by the remote attempt;
based on determining that the certificate is trusted by the remote attempt, complete, based on one or more second data communications with the secure server, the establishment process for the secure connection; and
send and/or receive, by the computing device, data via the secure connection.

14. The computing device of claim 13, wherein the local determination that the certificate is not trusted is performed based on a local certificate store of the computing device; and
wherein the executable instructions, when executed by the one or more processors, cause the computing device to cause the one or more remote user sessions to be established by configuring the remote user session with a certificate store for the computing device.

15. The computing device of claim 13, wherein the executable instructions, when executed by the one or more processors, cause the computing device to select the remote user session based one or more of the following:
a determination that the address of the secure server is on a list of servers stored by the computing device,
a first indication that the remote user session is capable of performing the remote attempt,
a second indication that the remote user session communicates with the computing device via second secure connection,
a third indication that the remote user session has not performed the remote attempt,
a determination that the remote user session is on a list of trusted remote user sessions that is managed by an enterprise associated with the gateway, and
a fourth indication, received via the gateway, that the remote user session relayed the one or more first messages to the secure server.

16. The computing device of claim 13, wherein the computing device is a bring-your-own-device (BYOD) device configured to connect with one or more enterprise resources associated with an enterprise; and
wherein the gateway is associated with the enterprise.

17. One or more non-transitory computer-readable media storing executable instructions that, when executed, cause a computing device to:
cause, based on one or more first data communications with a gateway, one or more remote user sessions to be established for the computing device;
send, to a secure server, one or more first messages to initiate an establishment process for a secure connection with the secure server;
receive, from the secure server, one or more second messages that include a certificate for the secure server;
based on a local determination, performed by the computing device, that the certificate is not trusted, select, from the one or more remote user sessions, a remote user session that is to perform a remote attempt for determining trust in the certificate;
send, to the remote user session, the certificate to cause performance of the remote attempt;
receive, from the remote user session, data indicating a result of the remote attempt;

determine, based on the data indicating the result of the remote attempt, that the certificate is trusted by the remote attempt;

based on determining that the certificate is trusted by the remote attempt, complete, based on one or more second data communications with the secure server, the establishment process for the secure connection; and send and/or receive, by the computing device, data via the secure connection.

18. The one or more non-transitory computer-readable media of claim 17, wherein the local determination that the certificate is not trusted is performed based on a local certificate store of the computing device; and wherein the executable instructions, when executed, cause the computing device to cause the one or more remote user sessions to be established by configuring the remote user session with a certificate store for the computing device.

19. The one or more non-transitory computer-readable media of claim 17, wherein the executable instructions, when executed by the one or more processors, cause the computing device to select the remote user session based one or more of the following:

a determination that the address of the secure server is on a list of servers stored by the computing device, a first indication that the remote user session is capable of performing the remote attempt, a second indication that the remote user session communicates with the computing device via second secure connection, a third indication that the remote user session has not performed the remote attempt, a determination that the remote user session is on a list of trusted remote user sessions that is managed by an enterprise associated with the gateway, and a fourth indication, received via the gateway, that the remote user session relayed the one or more first messages to the secure server.

20. The one or more non-transitory computer-readable media of claim 17, wherein the computing device is a bring-your-own-device (BYOD) device configured to connect with one or more enterprise resources associated with an enterprise; and wherein the gateway is associated with the enterprise.

\* \* \* \* \*